United States Patent
Oudrhiri et al.

(10) Patent No.: US 12,212,229 B2
(45) Date of Patent: Jan. 28, 2025

(54) STATIC TRANSFER SWITCH WITH CONTROLLED PHASE ANGLE TRANSFER

(71) Applicant: ABB Schweiz AG, Baden (CH)

(72) Inventors: Adil Oudrhiri, Richmond, VA (US); Debrup Das, Fremont, CA (US); Zhiguo Pan, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 32 days.

(21) Appl. No.: 17/616,596

(22) PCT Filed: Jun. 3, 2019

(86) PCT No.: PCT/US2019/035201
§ 371 (c)(1),
(2) Date: Dec. 3, 2021

(87) PCT Pub. No.: WO2020/246955
PCT Pub. Date: Dec. 10, 2020

(65) Prior Publication Data
US 2022/0247304 A1 Aug. 4, 2022

(51) Int. Cl.
| | |
|---|---|
| H02M 1/088 | (2006.01) |
| G06F 1/26 | (2006.01) |
| G06F 1/30 | (2006.01) |
| H02J 3/00 | (2006.01) |
| H02J 9/06 | (2006.01) |
| H02M 3/135 | (2006.01) |

(52) U.S. Cl.
CPC ............ *H02M 1/088* (2013.01); *G06F 1/263* (2013.01); *G06F 1/30* (2013.01); *H02J 3/007* (2020.01); *H02J 3/0073* (2020.01); *H02J 9/068* (2020.01); *H02M 3/135* (2013.01); *H02J 2310/16* (2020.01)

(58) Field of Classification Search
CPC .... H02J 3/007; H02J 9/06; H02J 9/068; H02J 3/0073; H02J 9/062; H02J 2310/16; G06F 1/263; G06F 1/30
See application file for complete search history.

(56) References Cited

U.S. PATENT DOCUMENTS 4,761,563 A * 8/1988 Ross ................. H02J 9/066
307/64
6,317,346 B1 11/2001 Early
(Continued)

FOREIGN PATENT DOCUMENTS

| CN | 1881743 A | 12/2006 |
|---|---|---|
| CN | 103597734 A | 2/2014 |

(Continued)

OTHER PUBLICATIONS

International Search Report and Written Opinion, issued by the ISA/US United States Patent and Trademark Office, regarding corresponding patent application Serial No. PCT/US2019/035201; dated Aug. 16, 2019; 6 pages.

*Primary Examiner* — Ryan Johnson
(74) *Attorney, Agent, or Firm* — Greenberg Traurig, LLP

(57) ABSTRACT

A static transfer switch is provided for supplying power to a load alternately from two different power sources. Preferably, switching between the two power sources occurs within one electrical cycle. In order to control inrush currents and reduce disruption during power transfers between the two power sources, switches are provided to configure which input phases are connected to the output phases.

19 Claims, 5 Drawing Sheets

(56) References Cited

U.S. PATENT DOCUMENTS

| | | | |
|---|---|---|---|
| 2014/0132080 A1 | 5/2014 | Bush et al. | |
| 2016/0197483 A1* | 7/2016 | Steinert | H02J 3/0073 307/18 |
| 2019/0199086 A1* | 6/2019 | Li | H02H 7/1225 |

FOREIGN PATENT DOCUMENTS

| | | | |
|---|---|---|---|
| CN | 103812209 A | 5/2014 | |
| CN | 106873708 A | 7/2018 | |
| WO | 1992012562 A1 | 7/1992 | |
| WO | 1999060687 A1 | 11/1999 | |
| WO | 2017074706 A1 | 5/2017 | |

* cited by examiner

STATIC TRANSFER SWITCH WITH
CONTROLLED PHASE ANGLE TRANSFER

CROSS-REFERENCE TO RELATED
APPLICATIONS

This application is a national stage of International Patent Application Serial No.: PCT/US2019/035201, filed on Jun. 3, 2019; and which is herein incorporated by reference in its entirety.

BACKGROUND

The present inventions relate generally to a static transfer switch for transferring power from one power source to another power source to supply an electrical load.

Static transfer switches are used in the industry to control the electrical power supply to critical electrical components. In particular, static transfer switches are used for electrical loads like data centers where a constant, high-quality electrical supply is required.

An example of a static transfer switch 10 is shown in FIG. 1. As shown, two different electrical power sources 12A, 12B are coupled to the static transfer switch 10. The output of the static transfer switch 10 is coupled to an electrical load 14. Typically, the output is directly connected to a Power Distribution Unit (PDU) 14, which includes a transformer 16. The final electrical load may be a data center 30 (FIG. 2) including racks of computer servers. However, it is understood that static transfer switches 10 may also be used to supply power to other types of electrical loads.

The static transfer switch 10 may include a variety of sensors 18A, 18B, 20A, 20B to monitor electrical properties of the first and second power sources 12A, 12B and the power output. For example, it may be desirable to monitor the voltage 18A, 18B of each of the power sources 12A, 12B and to monitor current 20A and voltage 20B of the output. The static transfer switch 10 also includes one or more switches 22A, 22B associated with each of the power sources 12A, 12B. This allows the static transfer switch 10 to supply power to the output from either of the power sources 12A, 12B. For example, the first power source 12A may be the preferred power source 12A (e.g., the grid), and the second power source 12B may be a backup power source 12B (e.g., a generator). In normal use, power can be supplied from the first power source 12A to the load 14 by closing the first switch 22A and opening the second switch 22B (to disconnect the second power source 12B). In the event that the first power source 12A suffers from degraded performance (e.g., drop in voltage), the power supply can be transferred to the second power source 12B by opening the first switch 22A and closing the second switch 22B. Thus, the electrical load 14 is provided with a constant source of power despite the possibility of degraded performance events in one of the power sources 12A, 12B.

SUMMARY

A static transfer switch is described for minimizing electrical disruptions during a power transfer from one power source to another power source. The system senses the phase angle of the power source to be connected to the electrical load and determines which phase has a phase angle closest to a phase angle target. A switch is then used to connect the closest phase to a preselected phase output. Other phases are connected with switches to preselected phase outputs in phase order after the closest phase.

BRIEF DESCRIPTION OF SEVERAL VIEWS OF
THE DRAWINGS

The invention may be more fully understood by reading the following description in conjunction with the drawings, in which.

DETAILED DESCRIPTION

Figure 1:
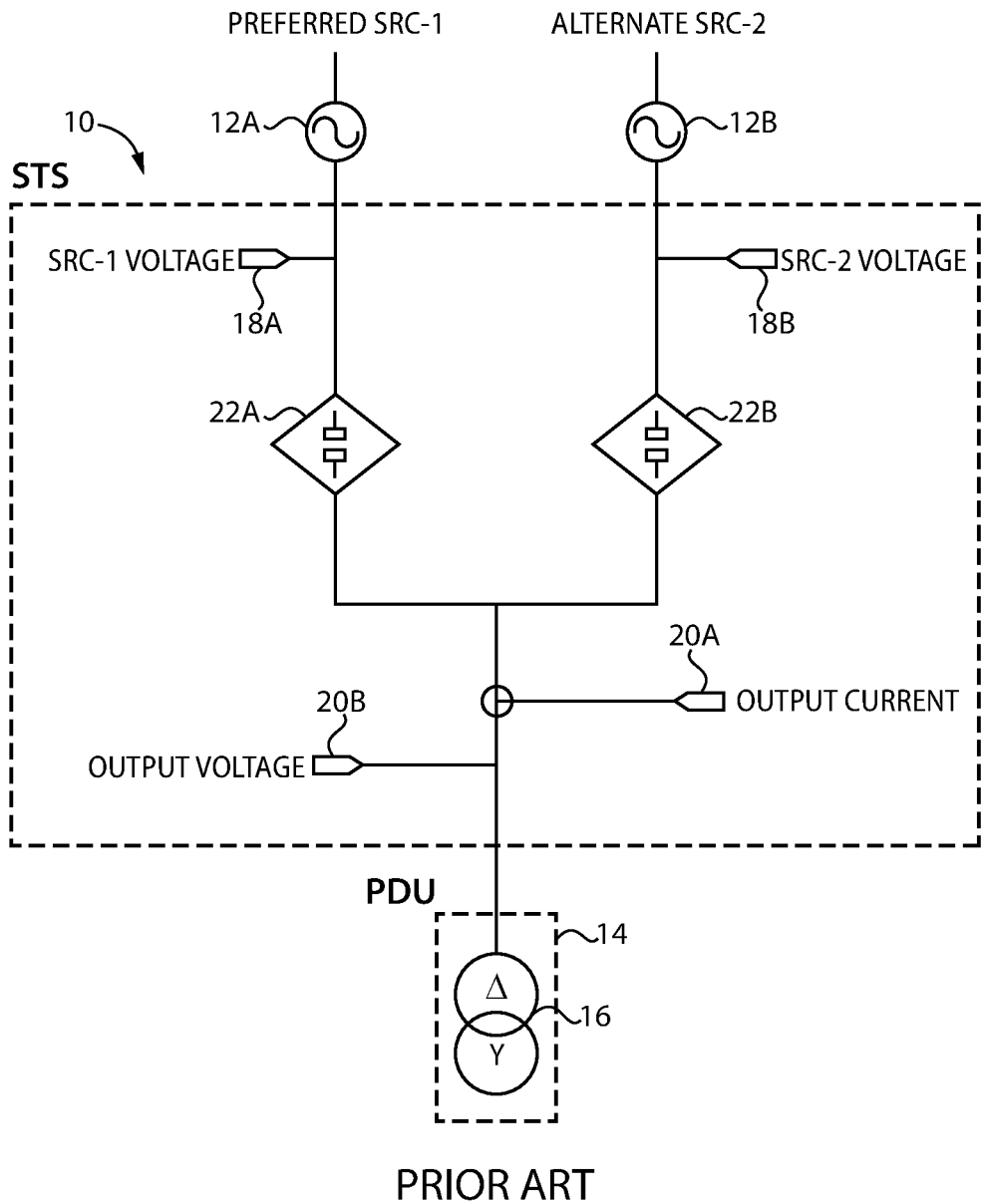
FIG. 1 is a schematic of a conventional static transfer switch.
Figure 2:
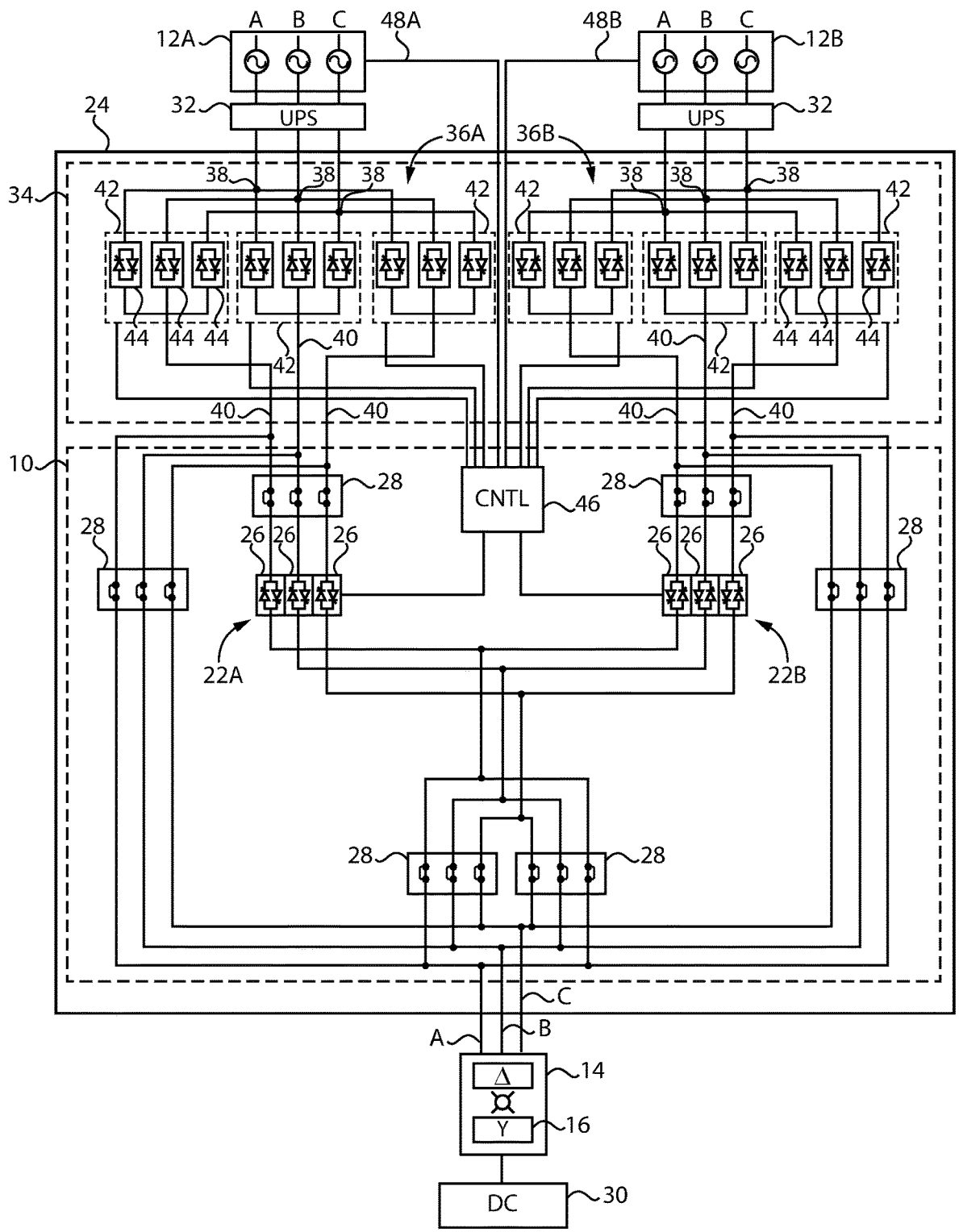
FIG. 2 is a schematic of a static transfer switch with a phase angle module.

An example of a three-phase static transfer switch 24 is shown in FIG. 2. Typically, static transfer switches 24 are designed to complete a switching event between the two power sources 12A, 12B within one electrical cycle of the power sources 12A, 12B. This is desirable so that a high-quality, constant power supply is provided with minimal effect on the electrical load 14, 30. In order to achieve switching events this quickly, it is typically necessary to use solid-state switches 22A, 22B to perform the switching event since solid-state switches 22A, 22B can be switched on and off in less than one electrical cycle. Examples of solid-state switches that may be used include integrated gate-commutated thyristors (IGCT), reverse blocking integrated gate-commutated thyristors (RB-IGCT), gate turn-off thyristors (GTO), insulated-gate bipolar transistors (IGBT), or field-effect transistors (FET). In the case of a multiphase static transfer switch 24, each of the main switches 22A, 22B will be made up of multiple individual switches 26, with at least one switch 26 for each phase A, B, C. A pair of anti-parallel thyristors 26 is particularly well-suited for each switch 26 associated with a phase A, B, C. Because the power sources 12A, 12B are AC power sources, each switch 26 typically includes two switches in an anti-parallel arrangement. However, in the present description, each pair of anti-parallel thyristors 26 are treated as a single switch 26 because they typically turn on and off together. The static transfer switch 24 may also include a series of manual switches 28 that are primarily used during maintenance to isolate sections of the circuit.

It is often preferred for the first and/or second power sources 12A, 12B to include an uninterruptible power supply (UPS) 32 to provide control over the electrical properties of the original source 12A, 12B and manage power drops or losses in the original source 12A, 12B. As noted, the output is typically coupled to the transformer 16 of a PDU 14, and the final electrical load 30 is often a data center 30 with racks of computer servers.

Although conventional static transfer switches 10 can provide a quick transfer between two power sources 12A, 12B, there is concern that phase angle differences between the first and second power sources 12A, 12B could cause undesirable changes in current flow during a transfer from one source 12A to the other source 12B. An example of possible phase angles for the two sources 12A, 12B is shown on the left side of FIG. 4. As illustrated, phase A of the first power source 12A may be about 0° at the time of the switching event between the power sources 12A, 12B. However, at that moment, the corresponding phase A of the second power source 12B may be at about 160°. If the source of the power is suddenly transferred from the first power source 12A to the second power source 12B with the illustrated difference of 160° of phase angle, undesirable current flow disruptions could occur. One alternative could be to open the first switches 22A for the first power source 12A when the phase angle of the first power source 12A is at 0° as illustrated, but wait to close the second switches 22B for the second power source 12B until the phase angle of phase A reaches 0° to match the shut off of the first power source 12A. However, this would require a delay of 200° (160°+200°=360°=0°) before phase A of the second power source 12B reaches 0° again. It would be desirable if a closer match between the phase angles of the first and second power sources 12A, 12B could be achieved during a switching event in a shorter period of time.

Referring back to FIG. 2, it may be desirable to provide a phase angle module 34 for conventional static transfer switches 10. In this case, static transfer switches 10 already in the field could be adapted to provide controlled phase angle transfer without replacing the entire static transfer switch 10. However, it is also understood and explained below that the structures of the phase angle module 34 could be incorporated directly within the static transfer switch 24 if desired.

In the embodiment of FIG. 2, the module 34 may include a first set of switches 36A coupled between the first set of power inputs 38 and the set of power outputs 40. Likewise, the second set of switches 36B are coupled between the second set of power inputs 38 and the set of power outputs 40. The first and second set of power inputs 38 each include one input 38 for each phase A, B, C of the respective power source 12A, 12B. That is, the first set of power inputs 38 has three inputs 38 for phases A, B, C of the first power source 12A, and the second set of power inputs 38 also has three inputs 38 for phases A, B, C of the second power source 12B. In a like fashion, each set of power outputs 40 includes one output 40 for each phase A, B, C of the electrical load 14 such that the set of outputs 40 has three outputs 40 for phases A, B, C.

The first and second set of switches 36A, 36B may each be arranged in a plurality of switch subsets 42. As shown in FIG. 2, each subset of switches 42 may have a number of switches 44 corresponding to the number of phases being supplied by the power sources 12A, 12B and output from the static transfer switch 24. Thus, in the example shown, each subset 42 has one switch 44 connected to phase A of the respective power source 12A, 12B, and another switch 44 connected to phase B of the respective power source 12A, 12B, and another switch 44 connected to phase C of the respective power source 12A, 12B. The outputs of the switches 44 in a subset 42 are all connected to a single phase of the static transfer switch output. That is, while the three switches 44 in the first subset 42 are connected to phases A, B, C, respectively, all three switches 44 in the first subset 42 are connected to phase A of the output. Likewise, the second subset of switches 42 is connected to phase B of the output although each of the switches 44 in the second subset 42 is connected on the input side to phases A, B, C, respectively. In the same way, the third subset of switches 42 is connected to phase C on the output side and phases A, B, C on the input side. It is noted that the phase angle module switches 44 may be any of the types of switches 26 described above for the static transfer switch module 10.

Referring to FIG. 2, when a switching event occurs between the first and second power sources 12A, 12B, a power transfer controller 46 uses a sensor 48A to determine the phase angle of at least one of the phases of the first power source 12A (e.g., phase A). The controller 46 also uses another sensor 48B to determine the phase angle of at least one of the phases of the second power source 12B. The controller 46 then determines which phase of the second power source 12B has a phase angle closest to the target phase of the first power source 12A. Other phase targets may also be used, such as a user-specified phase angle target. The controller 46 then closes switches 44 in the subsets of switches 42 in order to connect the most closely matching input phases to selected output phases.

Figure 3A:
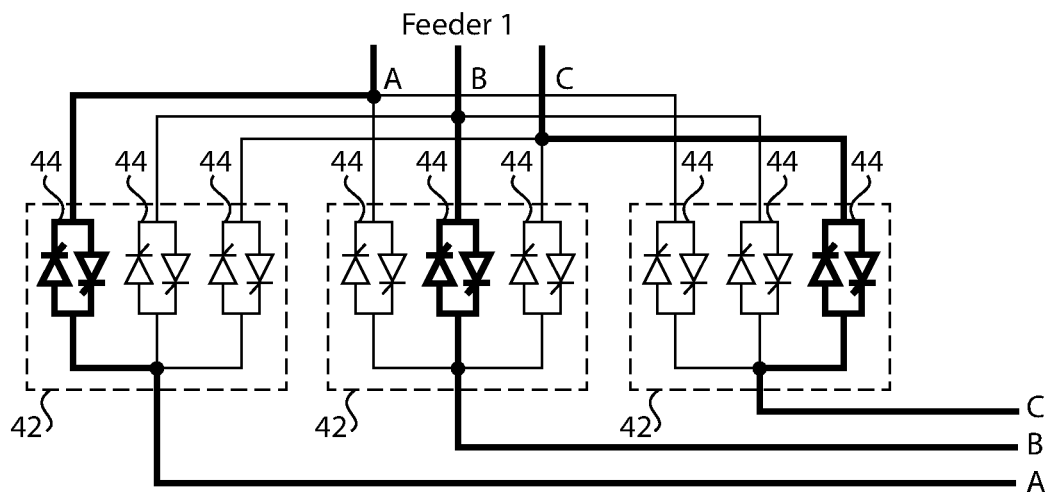
FIG. 3A is a schematic of one switching arrangement of the phase angle module.
Figure 3B:
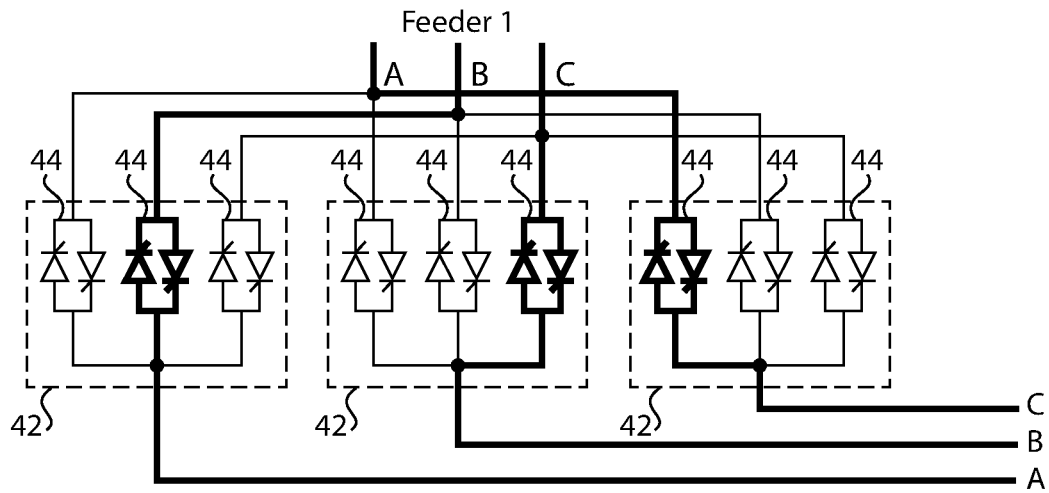
FIG. 3B is a schematic of another switching arrangement of the phase angle module.
Figure 3C:
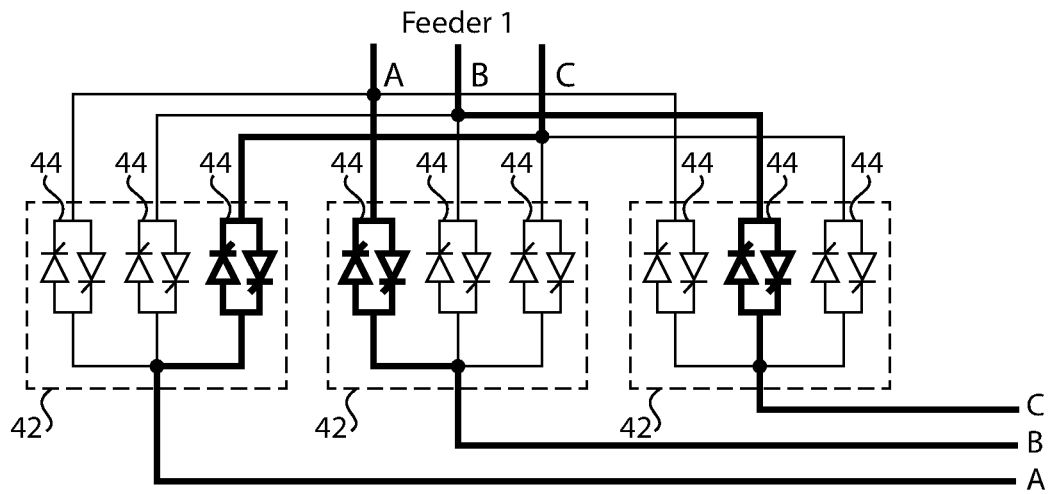
FIG. 3C is a schematic of another switching arrangement of the phase angle module.

Possible switching arrangements for the switches 44 of the phase angle module 34 are shown in FIGS. 3A-3C. In FIG. 3A, it is determined by the controller 10 that phase A of the input most closely matches the phase angle of the target for phase A of the output. In this circumstance, the first switch 44 in the first subset 42 is closed to connect the phase A input to the phase A output. The subsequent phases are preferably connected to the outputs in phase order. Thus, the second switch 44 in the second subset 42 is closed to connect the phase B input to the phase B output, and the third switch 44 in the third subset 42 is closed to connect the phase C input to the phase C output. In FIG. 3B, it is determined by the controller 10 that phase B of the input most closely matches the phase angle of the target for phase A of the output. In this circumstance, the second switch 44 in the first subset 42 is closed to connect the phase B input to the phase A output. The subsequent phases are preferably connected to the outputs in phase order. Thus, the third switch 44 in the second subset 42 is closed to connect the phase C input to the phase B output, and the first switch 44 in the third subset 42 is closed to connect the phase A input to the phase C output. In FIG. 3C, it is determined by the controller 10 that phase C of the input most closely matches the phase angle of the target for phase A of the output. In this circumstance, the third switch 44 in the first subset 42 is closed to connect the phase C input to the phase A output. The subsequent phases are preferably connected to the outputs in phase order. Thus, the first switch 44 in the second subset 42 is closed to connect the phase A input to the phase B output, and the second switch 44 in the third subset 42 is closed to connect the phase B input to the phase C output.

Figure 4:
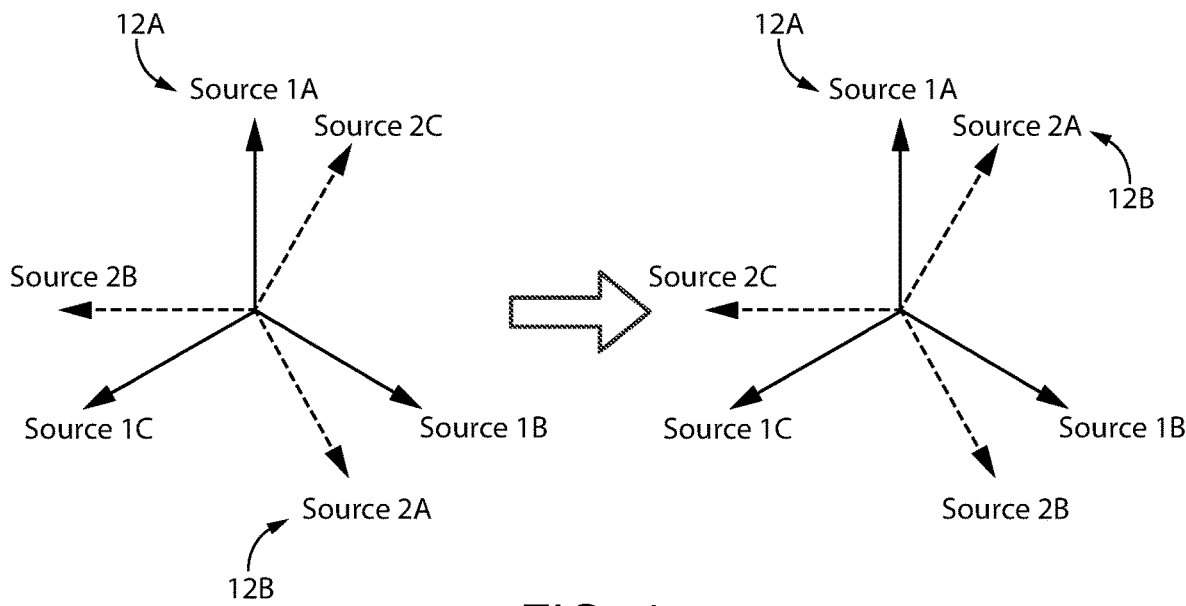
FIG. 4 is an illustration of phase angles of two power sources and a reconfigured phase angle match between the two power sources.

FIG. 4 illustrates how the phase angle module 34 can be used to more closely match phase angles during a switching event. As shown in the left side of FIG. 4, and described above, the phase angles of corresponding phases of the first and second power sources 12A, 12B may substantially differ from each other. That is, while phase A of the first power source 12A has a phase angle of about 0°, the phase angle of phase A of the second power source 12B is about 160°. However, in this example, if phase C in the second power source 12B is used in place of phase A using the switches 44 to reconfigure the phase connections, the resulting phase A of the second power source 12B will have a phase angle of about 40° (right side of FIG. 4) which is much closer to the target of 0°.

Figure 5:
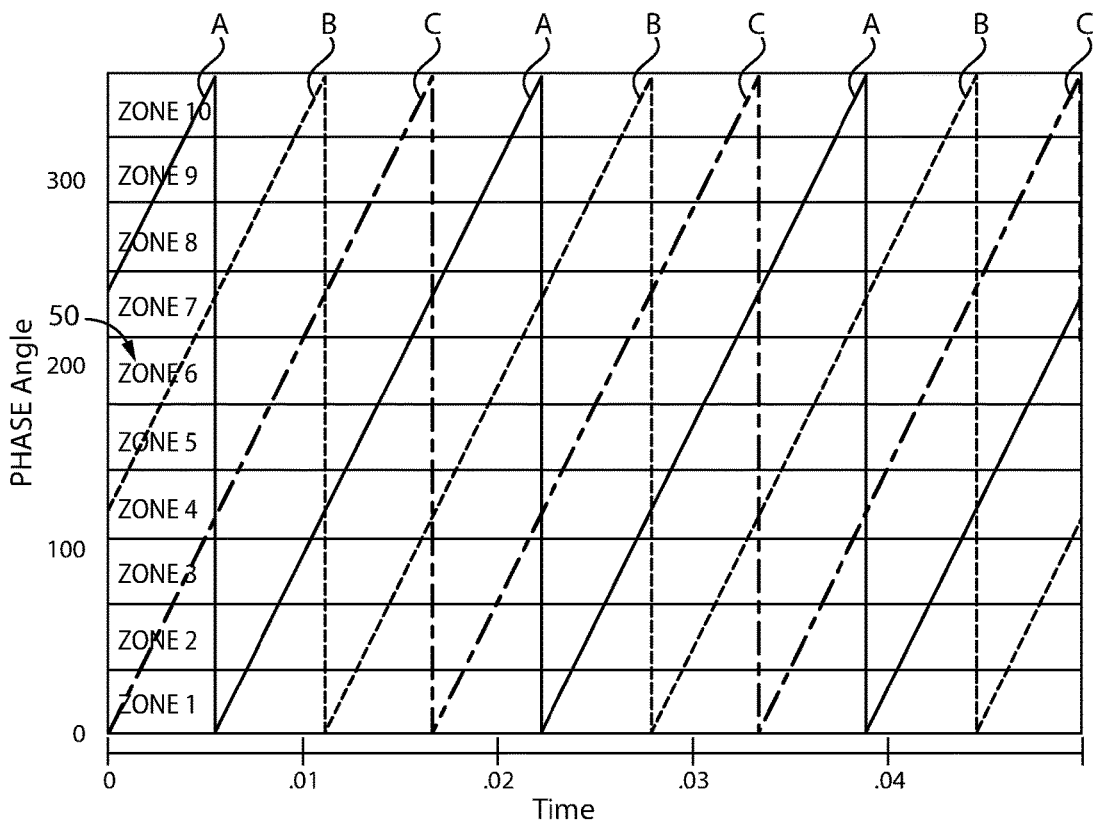
FIG. 5 is a chart showing phase angle changes in a three phase power source.

FIG. 5 further illustrates the varying phase angles of the phases and how phase targets may be used to select which phase inputs to connect to the phase outputs. As shown, each phase A, B, C varies over time between 0° and 360° with each phase A, B, C being separated from adjacent phases A, B, C by 120°. As noted, various types of targets may be used in determining which input phases to match with corresponding output phases. For example, in FIG. 5, the range of phase angle possibilities (360°) may be split up into 10 zones with each zone covering 16°. The user may then specify within which zone the second power source 12B should be switched on at. Thus, for example, if the user selects zone 6 (50) for the transfer, the first input phase to enter zone 6 (50) is phase B. Thus, the phase angle module switches 44 may be configured to connect input phase B to output phase A (FIG. 3B). While the switches 44 could be closed immediately after determining which input phase is closest to zone 6 (50), it may be preferred to delay closing the switches 44 until phase B is actually within zone 6 (50). Likewise, the other switches 44 could be closed immediately to connect input phase C to output phase B and to connect input phase A to output phase C. However, it may be desirable to delay closing the switch 44 for input phase C until input phase C actually enters zone 6 (50). Similarly, it may be desirable to further delay closing the switch 44 for input phase A until input phase A actually enters zone 6 (50). Other types of ranges may also be desirable to set the phase angle target.

Various alternative embodiments are possible in view of the descriptions above. For example, although the switching event described above for matching the phase angles of input phases and output phases was described in the context of a power transfer from the first power source 12A to the second power source 12B, it is also possible to use the same phase angle matching switching arrangement for a return switching event from the second power source 12B to the first power source 12A. In this switching event, the sensor 48A of the first power source 12A would then be used to determine the phase angle of the first power source 12A to determine which input phases to match to corresponding output phases. It is understood that the sensors 18, 20, 48 referred to herein need not be physically separate sensors, but instead, may also represent sensor input parameters, logic determinations, etc.

Figure 6:
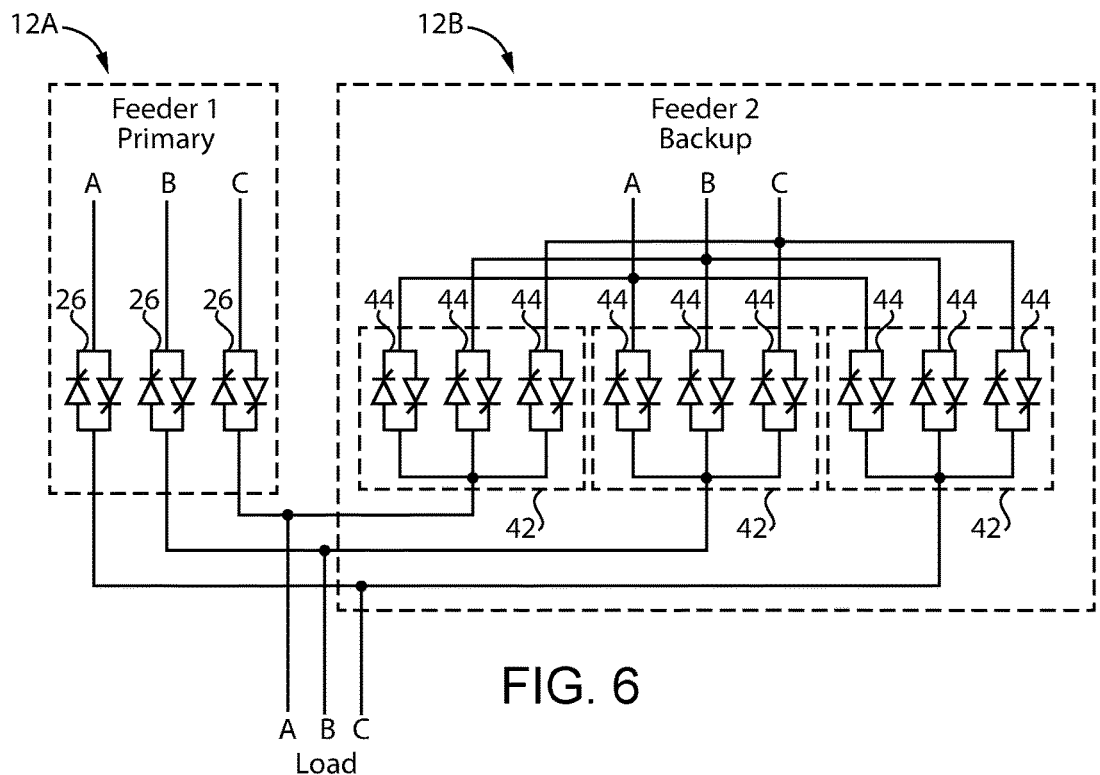
FIG. 6 is an alternative embodiment of phase angle switches for a static transfer switch.

As shown in FIG. 6, where return switching does not require phase angle matching circuitry, the phase angle switches 44 may be included only on the second power source 12B side and single switches 26 may be included on the first power source 12A side.

Additionally, where it is not necessary to retrofit an existing static transfer switch 10 with phase angle matching capability, the phase angle switches 44 may be substituted for the main static transfer switches 26 so that the phase angle switches 44 provide the main switching event between the power sources 12A, 12B.

Figure 7:
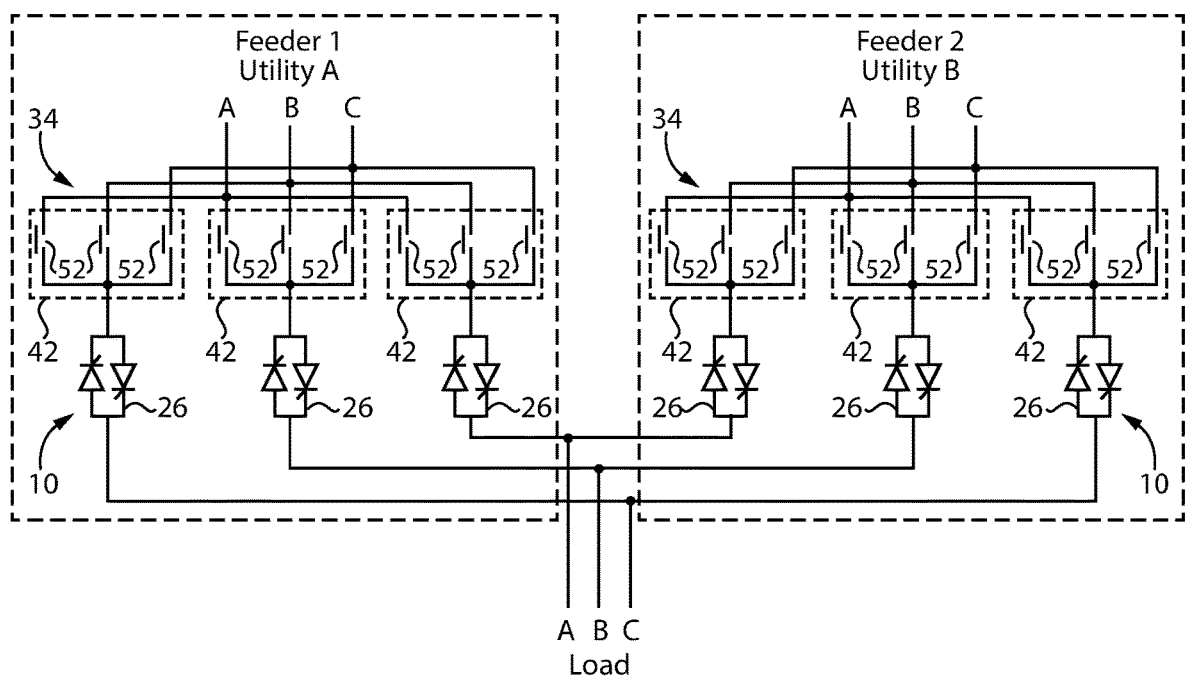
FIG. 7 is an another alternative embodiment of phase angle switches for a static transfer switch.

FIG. 7 illustrates an embodiment where electromechanical switches 52 may be used for the phase angle matching to reduce costs or provide other advantages. Electromechanical switches 52 are not normally used for static transfer switches 10 because of the slow switching times of such switches 52. However, if the power source sensors 48A, 48B are used to monitor phase shift between the first and second power sources 12A, 12B before the switching event occurs, the electromechanical switches 52 may be switched to match input and output phases according to the monitored phase shift. If the phase shift changes over time such that a different switching arrangement provides a better phase angle match, the switches 52 may be reconfigured. The outputs of each subset 42 of electromechanical switches 52 is connected to a control switch 26, which is a solid-state relay as described above. Thus, during a switching event the control switches 26 may be used to transfer power within one electrical cycle with the electromechanical switches 52 already having been configured ahead of time to match the phase angles.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A static transfer switch, comprising:
a first set of power inputs coupled to a first three-phase electrical power source, each of the first power inputs being coupled to one phase of the first three-phase electrical power source;
a second set of power inputs coupled to a second three-phase electrical power source, each of the second power inputs being coupled to one phase of the second three-phase electrical power source;
a set of power outputs coupled to a three-phase electrical load, each of the power outputs being coupled to one phase of the three-phase electrical load;
a first set of switches coupled between the first set of power inputs and the set of power outputs;
a second set of switches coupled between the second set of power inputs and the set of power outputs;
a first sensor to determine an electrical property of the first three-phase electrical power source;
a second sensor to determine a phase angle of at least one of the phases of the second three-phase electrical power source;
a power transfer controller, the first and second sensors being inputs to the power transfer controller and the first and second set of switches being outputs of the power transfer controller, the power transfer controller determining which phase of the second three-phase electrical power source is closest to a power transfer phase angle target;
wherein during normal operation the power transfer controller closes the first set of switches to electrically connect the first set of power inputs and the set of power outputs together and opens the second set of switches to electrically disconnect the second set of power inputs and the set of power outputs, the first three-phase electrical power source thereby supplying power to the three-phase electrical load;

wherein when the first sensor identifies degraded performance of the first three-phase electrical power source, the power transfer controller initiates a switching event, comprising:
opening the first set of switches to electrically disconnect the first set of power inputs and the set of power outputs;
closing a first switch of the second set of switches to connect the phase closest to the power transfer phase angle target to a pre-selected one of the power outputs;
closing a second switch of the second set of switches to connect a next phase in phase order to another one of the power outputs in phase order; and
closing a third switch of the second set of switches to connect a last phase in phase order to another one of the power outputs in phase order;
wherein the power transfer phase angle target is a range, and closing the first switch is delayed until the phase closest to the power transfer phase angle target is within the range.

2. The static transfer switch according to claim 1, wherein the switching event occurs within one electrical cycle of the second three-phase electrical power source.

3. The static transfer switch according to claim 1, wherein the first, second and third switches comprise integrated gate-commutated thyristors (IGCT), reverse blocking integrated gate-commutated thyristors (IGCT), gate turn-off thyristors (GTO), insulated-gate bipolar transistors (IGBT), or field-effect transistors (FET).

4. The static transfer switch according to claim 1, wherein the first, second and third switches comprise solid state switches.

5. The static transfer switch according to claim 1, wherein the first, second and third switches comprise thyristors.

6. The static transfer switch according to claim 1, wherein the set of power outputs are coupled to a transformer.

7. The static transfer switch according to claim 1, wherein the three-phase electrical load comprises a data center.

8. The static transfer switch according to claim 1, wherein one of the first and second three-phase electrical power sources comprises an uninterruptible power supply (UPS).

9. The static transfer switch according to claim 1, wherein closing the second switch is delayed after closing the first switch, and closing the third switch is delayed after closing the second switch.

10. The static transfer switch according to claim 1, wherein closing the second switch is delayed until the next phase is within the range, and closing the third switch is delayed until the last phase is within the range.

11. The static transfer switch according to claim 1, wherein the second set of switches comprises three switches for each phase of the second three-phase electrical power source.

12. The static transfer switch according to claim 1, wherein the second set of switches comprises three switches for each phase of the three-phase electrical load.

13. The static transfer switch according to claim 1, wherein the second set of switches comprises nine switches grouped in three subsets of switches with three switches in each subset, each phase of the second three-phase electrical power source being coupled to one of the switches in each of the three subsets of switches, and all of the switches in each of the three subset of switches being coupled to the same phase of the three-phase electrical load.

14. The static transfer switch according to claim 1, further comprising a third sensor to determine a phase angle of at least one of the phases of the first three-phase electrical power source, wherein the power transfer controller determines which phase of the first three-phase electrical power source is closest to the power transfer phase angle target, and the power transfer controller initiates a return switching event, comprising:
opening the second set of switches to electrically disconnect the second set of power inputs and the set of power outputs;
closing a first switch of a fourth set of switches to connect the closest phase to a pre-selected one of the power outputs;
closing a second switch of a fifth set of switches to connect a next phase in phase order to another one of the power outputs in phase order; and
closing a third switch of a sixth set of switches to connect a last phase in phase order to another one of the power outputs in phase order.

15. The static transfer switch according to claim 1, further comprising a third set of switches, one switch of the third set of switches being coupled to each phase of the three-phase electrical load, wherein the switching event further comprises closing the third set of switches.

16. The static transfer switch according to claim 1, further comprising a third sensor to determine a phase angle of at least one of the phases of the first three-phase electrical power source;
wherein the power transfer controller monitors a phase shift between the third sensor and the second sensor;
wherein the second set of switches comprises an electromechanical switch and a solid state switch for each phase of the second three-phase electrical power source;
wherein the power transfer angle target is a minimum phase shift between the third sensor and the second sensor;
wherein the power transfer controller determines which phase of the second three-phase electrical power source is closest to the minimum phase shift and closes one of the electromechanical switches of the second set of switches to pre-connect the closest phase to a pre-selected one of the power outputs before the first sensor identifies degraded performance of the first three-phase electrical power source; and
wherein the power transfer controller closes one of the solid state switches corresponding to the closed electromechanical switch during the switching event.

17. The static transfer switch according to claim 1, wherein the first, second and third switches comprise solid state switches, the three-phase electrical load comprises a data center, and one of the first and second three-phase electrical power sources comprises an uninterruptible power supply (UPS).

18. The static transfer switch according to claim 17, wherein the switching event occurs within one electrical cycle of the second three-phase electrical power source, closing the second switch is delayed after closing the first switch, and closing the third switch is delayed after closing the second switch, the second set of switches comprises three switches for each phase of the second three-phase electrical power source, and the second set of switches comprises three switches for each phase of the three-phase electrical load.

19. The static transfer switch according to claim 18, wherein the power transfer phase angle target is a range, and closing the first switch is delayed until the phase closest to the power transfer phase angle target is within the range, closing the second switch is delayed until the next phase is within the range, and closing the third switch is delayed until the last phase is within the range, and the second set of switches comprises nine switches grouped in three subsets of switches with three switches in each subset, each phase of the second three-phase electrical power source being coupled to one of the switches in each of the three subsets of switches, and all of the switches in each of the three subset of switches being coupled to the same phase of the three-phase electrical load.

* * * * *